United States Patent [19]

Turcotte et al.

[11] Patent Number: 5,290,469
[45] Date of Patent: Mar. 1, 1994

[54] GLYCOL-BASED POLYCARBOXYLATE-CONTAINING ANTIFREEZE/COOLANT FORMULATIONS FOR RESISTING CAVITATION EROSION-CORROSION ON ALUMINUM

[75] Inventors: David E. Turcotte, Woodhaven; John J. Conville, Canton; James T. Lyon, Novi; Stanley T. Hirozawa, Birmingham; Shrikant V. DeSai, Grosse Ille, all of Mich.

[73] Assignee: BASF Corporation, Parsippany, N.J.

[21] Appl. No.: 734,722

[22] Filed: Jul. 23, 1991

[51] Int. Cl.$^5$ ............................................... C09K 5/00
[52] U.S. Cl. ...................................... 252/76; 252/79; 252/396
[58] Field of Search .......................... 252/76, 79, 396

[56] References Cited

U.S. PATENT DOCUMENTS

| | | | |
|---|---|---|---|
| 3,278,585 | 10/1966 | Baker et al. | 252/79 |
| 3,948,792 | 4/1976 | Watson et al. | 252/181 |
| 4,487,712 | 12/1984 | Wilson et al. | 252/79 |
| 4,717,495 | 1/1988 | Hercamp et al. | 252/75 |
| 5,064,552 | 11/1991 | Oppenlaender et al. | 252/78.3 |
| 5,071,580 | 12/1991 | Little | 252/71 |
| 5,076,951 | 12/1991 | Miles et al. | 252/79 |

FOREIGN PATENT DOCUMENTS 245557 11/1987 European Pat. Off.
1414918 11/1975 United Kingdom.

Primary Examiner—Christine Skane
Attorney, Agent, or Firm—Nixon & Vanderhye

[57] ABSTRACT

The present invention provides an antifreeze/coolant composition with polymeric polycarboxylates which reduces the corrosion rate of heat rejecting aluminum, and is effective at relatively low concentrations.

8 Claims, No Drawings

GLYCOL-BASED POLYCARBOXYLATE-CONTAINING ANTIFREEZE/COOLANT FORMULATIONS FOR RESISTING CAVITATION EROSION-CORROSION ON ALUMINUM

BACKGROUND OF THE INVENTION

1. Field of the Invention

This invention relates to antifreeze/coolant compositions and more specifically to antifreeze/coolant compositions with polycarboxylates which reduce corrosion in heat rejecting aluminum.

2. Description of the Prior Art

Antifreeze/coolant technology in North America uses silicate as a corrosion inhibitor. Silicates are particularly useful in protecting aluminum automotive cooling system components. The silicate corrosion inhibitors generally also use a phosphate, usually in the form of an alkali metal salt, to help protect metal cooling system parts and also as a buffer to control the pH of the coolant. Often phosphate salts are used to help maintain a stable alkaline environment from which multiple corrosion inhibitors can most effectively function.

Traditionally antifreeze/coolant is sold at nearly one-hundred percent glycol content. This concentrated packaging allows for flexibility so that the user can dilute the antifreeze/coolant, as needed, with available water to obtain the required freeze/boil protection. However, corrosion protection is needed over the entire dilution range.

Today, in modern automotive engineering, many engine components are fabricated from aluminum. Engine coolants, primarily ethylene glycol based solutions, must transfer heat from operating aluminum engines while inhibiting corrosion. Older automotive engines did not have aluminum components and thus, the traditional antifreeze/coolant compositions may produce corrosion in heat rejecting aluminum or aluminum alloy components.

Certain polycarboxylate type materials have been disclosed for prevention of precipitates in antifreeze/coolant compositions. For example, U.S. Pat. No. 3,663,448 discloses scale inhibition for industrial cooling waters using amino phosphonate and polyacrylic acid compounds. U.S. Pat. No. 3,948,792 discloses an aqueous additive mixture to reduce and modify the amount of silicate scale formed in automotive cooling systems.

European patent 245557 discloses the use of a variety of compounds including sodium polyacrylate to prevent alkaline earth metal silicate precipitation. U.S. Pat. No. 4,487,712 discloses the use of polyacrylic acid as a silicate stabilizer to inhibit gelation. Gelation is a silicate depletion mechanism which can occur separately from hard water precipitates.

In spite of these disclosures, there remains a need for a concentrated silicate-phosphate type antifreeze/coolant composition which reduces corrosion in heat rejecting aluminum and aluminum alloys.

SUMMARY OF THE INVENTION

The present invention has met the above-described need by providing an antifreeze/coolant composition with polymeric polycarboxylate additives which reduce corrosion in heat rejecting aluminum and aluminum alloys. This additive is soluble in alcohol and alcohol/water mixtures, is compatible with other commonly used antifreeze/coolant components, does not corrode or damage automotive cooling systems and is effective at relatively low concentrations.

It is an object to provide antifreeze/coolant compositions which are effective at reducing the corrosion of heat rejecting aluminum and aluminum alloys.

It is another object of the present invention to use polymeric polycarboxylates in silicate-phosphate type antifreeze/coolant compositions to reduce the corrosion in heat rejecting aluminum and aluminum alloys.

These and other objects of the present invention will be more fully understood from the following description of the invention.

DESCRIPTION OF THE PREFERRED EMBODIMENTS

The present invention provides an antifreeze/coolant composition with polymeric polycarboxylate additives which reduce corrosion in heat rejecting aluminum or aluminum alloys. This additive is soluble in alcohol and alcohol/water mixtures, is compatible with other commonly used antifreeze/coolant components, does not corrode or damage automotive cooling systems and is effective at relatively low concentrations.

The preferred class of polymeric polycarboxylates are based on polyacrylic acid (PAA) and/or polymaleic acid (PMA). These polymeric polycarboxylates are compatible with other components in the typical antifreeze/coolant composition, and present no additional toxicity or disposal concerns.

Other materials which are useful in the present invention include Belclene water treatment additives from Ciba-Geigy, Colloid additives from Colloids, Inc., Good-rite polyacrylates and Carbopol resins from BF Goodrich and the like.

The molecular weight distribution of useful materials may average about one hundred grams/mole to about three million grams/mole. Chemically, the materials should be based on polymers and copolymers of acrylic acid and maleic acid, including many modifiers such as alcohols.

The polycarboxylates used in the present invention have a molecular weight range of from about 500 to about 250,000, with a preferred range of from 500 to 12,000. More specifically, the most preferred additives have average molecular weights in the range of about 500 to about 4,000, and more specifically about 1300 to about 1800 and about 300 to about 4600.

When reference is made to polycarboxylates within the context of the present invention it is understood to encompass those water-soluble homo- and copolymers having at least one monomeric unit containing $C_{3-6}$ monoethylenically unsaturated mono- or dicarboxylic acids or their salts. Suitable monocarboxylic acids of this type are for example, acrylic acid, methacrylic acid, ethacrylic acid, vinylacetic acid, allylacetic acid, and crotonic acid. The preferable monocarboxylic acids from this group are acrylic acid and methacrylic acid. A further component of the polycarboxylate comprises monoethylenically unsaturated $C_{4-6}$ dicarboxylic acids, for example, maleic acid, itaconic acid, citraconic acid, mesaconic acid, fumaric acid, or methylenemalonic acid. The preferred acid is maleic acid.

Other organic substituents may be used as comonomers or as modifiers added along the polymer chain. Examples of such are shown as Formula I.

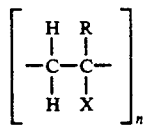

where R=H or a secondary alcohol such as isopropanol, X=COOH, COO⁻Na+, methylvinylether, isobutylene, vinyl acetate, acrylamide, or styrene, with the proviso that when R=a secondary alcohol, X=COOH or COO⁻Na+, and when X=any other above referenced group, R=H. The preferred polycarboxylates are a copolymer of acrylic acid and maleic acid, or their sodium salts, said copolymer having a molecular weight of 3000, and a sodium salt of polyacrylic acid modified with a secondary alcohol such an isopropanol, said polymer having a molecular weight of 4000.

The polycarboxylates used in the present invention are obtained by methods well known to those skilled in the art. The general method of synthesis is via free acid radical polymerization. The polymerization may be carried out in an aqueous medium, in the presence of polymerization initiators, with or without regulants. The polymerization can take various forms; for example, the monomer(s) can be polymerized batchwise in the form of aqueous solutions. It is also possible to introduce into the polymerization reactor a portion of the monomer(s) and a portion of the initiator, to heat the mixture in an inert atmosphere to the polymerization temperature and then to add the remaining monomer(s) and initiator to the reactor at the rate of polymerization. Polymerization temperatures range from 20° C. to 200° C. At temperatures above 100° C., pressure vessels are employed.

The carboxyl containing monomers can be polymerized in the free carboxylic acid form, in the partial neutralized form, or completely neutralized. The neutralization is preferably effected with alkali metal or ammonium base.

The polymerization initiators used are preferably water soluble free radical formers such as hydrogen peroxide, peroxodisulfates and mixtures of the two. The polymerization may also be started with water insoluble initiators such as dibenzoyl peroxide, dilaurylperoxide, or azodiisobutyronitrile. The polymerization may be carried out in the presence of regulants. Examples of such regulants include water soluble mercaptans, ammonium formate, and hydroxylammonium sulfate.

Examples of the polycarboxylates which may be used in the present invention are those marketed by BASF under the trademark SOKALAN ® polycarboxylates, which are available in aqueous polymer solutions.

The polymeric polycarboxylate is effective at relatively low concentrations, generally about 100 to about 1000 ppm per total volume of antifreeze/coolant. While particularly preferred additive, Sokalan ® CP 10 S, has been shown to be particularly effective at about 0.15 weight percent in a silicate-phosphate type coolant in reducing hot surface aluminum corrosion, other levels of additive and different polycarboxylates may also be useful.

In addition to silicate-phosphate type coolants, these additives are useful in silicate-borax, amine-phosphate, amine-borax, organic acid-phosphate organic acid-borax type coolants, and the like.

The most preferred antifreeze/coolant composition is a silicate-phosphate type having about 94% antifreeze grade glycols and about 3% corrosion inhibitors, with the balance being water. While ethylene glycol is preferred in the present invention, propylene glycol and mixtures of ethylene glycol and propylene glycol may also be used.

The corrosion inhibitors generally are a mixture of azole compounds, nitrate salts, defoamers and other constituents in addition to the stabilized silicate and phosphate salts. The stabilized silicate technology is disclosed in U.S. Pat. Nos. 4,370,255; 4,362,644 and 4,354,002, all hereby incorporated by reference. Antifreeze/coolant compositions are well-known in the art and many variations of the above-described composition will be useful in the invention.

The following examples serve to further illustrate the present invention and should in no way be construed as limiting the scope thereof.

EXAMPLES

ASTM D4340-84 is the standard test method for Corrosion of Cast Aluminum Alloys in Engine Coolants Under Heat Rejecting Conditions. This test was selected as a method to investigate the utility of polycarboxylates as general corrosion inhibitors for heat rejecting aluminum. ASTM D4340-84 simulates the real world operating condition of heat rejecting aluminum. Thermally influenced effects such as changing thermal coefficient of expansion and rates of mass transport can be reflected in this test. It is of interest to identify materials which can reduce corrosion rates by this test.

A silicate-phosphate based on antifreeze/coolant pH 10.5 was selected for testing. The coolant is 94% antifreeze grade glycols, 3% corrosion inhibitors and 3% water. The corrosion inhibitors included nitrate salts, azole compounds, defoamer, caustic soda and alkali metal phosphates. Also included were stabilized silicate copolymers of the type discussed in U.S. Pat. Nos. 4,370,255 4,362,644 and 4,354,002, all of which are hereby incorporated by reference.

The coolant was evaluated by ASTM D4340-84. To this base coolant a modified polyacrylic acid was added at 0.15 weight percent. This gave an improved coolant which was also evaluated by ASTM D4340-84. Duplicate results for each experiment and ASTM specified maximum weight loss are shown in Table 1. All rates are in milligrams/cm-cm/week.

TABLE 1

| Specimen Tested | Coolant | Coolant + Additive | ASTM Spec. To Pass |
|---|---|---|---|
| 319-100 |  | 0.217 | 1.0 |
| 319-101 |  | 0.168 | 1.0 |
| MS370 | 0.7008 |  | 1.0 |
| MS574 | 0.6268 |  | 1.0 |
| AVERAGE | 0.6638 | 0.1925 |  |
| RESULT | PASS | PASS |  |

From Table 1, it can be seen that the polyacrylate containing coolant exhibited an average corrosion rate of 0.1925 mg/cm-cm/week while the base coolant gave 0.6638 mg/cm-cm/week. This represents a reduction in aluminum corrosion rate of over three times.

The coolant containing Sokalan ® CP 10 S was evaluated by the ASTM D1384-87 standard test method. This is a corrosion weight loss test method for engine coolants in glassware. Weight change results for a control, 0.15 wt. % Sokalan ® CP 10 S containing coolant and the ASTM specifications required to pass are given in Table 2. All weight changes are in milligrams per coupon (mg/coupon).

TABLE 2

| Metal Coupon | Spec. to Pass | Base Coolant | Base Coolant + Additive |
|---|---|---|---|
| Copper | −10 | −0.6 | −1.1 |
| 2006 Solder | −30 | +0.3 | −0.6 |
| Brass | −10 | −2.4 | −9.0 |
| Mild Steel | −10 | +0.6 | −0.1 |
| Cast Iron | −10 | −0.8 | +1.8 |
| Aluminum | −30 | +6.1 | +2.6 |
| TEST RESULT | | PASS | PASS |

The addition of 0.15 weight percent of Sokalan ® CP 10 S caused no significant corrosion to cooling system metals based upon the results of Table 2. Table 2 shows that the base coolant and the modified coolant both passed.

Whereas particular embodiments of the invention have been described above for purposes of illustration, it will be appreciated by those skilled in the art that numerous variations of the details may be made without departing from the invention as described in the appended claims.

What is claimed is:

1. A glycol-based automotive antifreeze/coolant solution which reduces the corrosion rate of heat rejecting aluminum or aluminum alloy including a corrosion rate reducing effective amount of a polycarboxylate additive which is at least one of (i) a sodium salt of a copolymer of acrylic acid and maleic acid, and (ii) a secondary alcohol modified polyacrylic acid.

2. A glycol-based automotive antifreeze/coolant solution as in claim 1, wherein said polycarboxylate is a sodium salt of a secondary alcohol modified polyacrylic acid.

3. A glycol-based automotive antifreeze/coolant solution as in claim 1 or 2, wherein said polycarboxylate additive is present in an amount of about 10 to 1000 ppm per total volume of the antifreeze/coolant solution.

4. A glycol-based automotive antifreeze/coolant solution as in claim 3, wherein said polycarboxylate has a molecular weight range of from about 500 to about 250,000.

5. A glycol-based automotive antifreeze/coolant solution as in claim 1, wherein said polycarboxylate is a sodium salt of an acrylic acid/maleic acid copolymer having a molecular weight of 3000.

6. A glycol-based automotive antifreeze/coolant solution as in claim 1, wherein said polycarboxylate is a polyacrylic acid modified with an aliphatic secondary alcohol.

7. A glycol-based automotive antifreeze/coolant solution as in claim 6, wherein said polycarboxylate is a sodium salt of a polyacrylic acid modified with an aliphatic secondary alcohol having a molecular weight of 4000.

8. A glycol-based automotive antifreeze/coolant solution as in claim 6 or 7, wherein said aliphatic secondary alcohol is isopropanol.

* * * * *